(12) United States Patent
LaPuzza

(10) Patent No.: US 6,415,734 B1
(45) Date of Patent: Jul. 9, 2002

(54) HIGH VISIBILITY MARKING PANEL FOR AERIAL PHOTOGRAMMETRIC GROUND MAPPING

(76) Inventor: James LaPuzza, P.O. Box 4603, Rio Rico, AZ (US) 85648

( * ) Notice: Subject to any disclaimer, the term of this patent is extended or adjusted under 35 U.S.C. 154(b) by 84 days.

(21) Appl. No.: 09/684,600

(22) Filed: Oct. 6, 2000

(51) Int. Cl.$^7$ ............................................. G01D 13/00
(52) U.S. Cl. ...................... 116/201; 116/209; 428/43; 428/181
(58) Field of Search ........................... D10/66; 116/209, 116/201; 52/103

(56) References Cited

U.S. PATENT DOCUMENTS

| | | |
|---|---|---|
| 1,507,191 A | 9/1924 | Ladd |
| 1,796,233 A | 3/1931 | Barns |
| 3,428,019 A | 2/1969 | Tillay |
| 3,766,312 A | 10/1973 | McConnell |
| 3,973,513 A | 8/1976 | Huwe |
| 4,041,529 A | 8/1977 | Masterfield |
| 4,261,283 A | 4/1981 | Taylor |
| 4,270,482 A | 6/1981 | Forsyth |
| 4,300,469 A | 11/1981 | Huwe |
| 4,316,554 A | 2/1982 | Lloyd |
| 4,474,349 A | 10/1984 | Loeckle |
| 4,497,551 A | 2/1985 | Lapeyre |

Primary Examiner—Alexander S. Thomas
(74) Attorney, Agent, or Firm—LaValle D. Ptak

(57) ABSTRACT

A high visibility panel for use with aerial mapping and aerial surveying is constructed of lightweight corrugated cardboard. Two sections, each having a reflection side and a deflection side, are used. The panel sections are folded alternately into an accordion pleat into short segments along the entire length of each of the panel sections. The panel sections can be installed with either face toward the sky, depending upon the ground conditions on which they are installed. The panel sections are extended to expand the accordion pleating and the ends are secured to the underlying surface to cause the segments to diverge between 10° and 30° from the ground plane to which the panel sections are attached.

8 Claims, 2 Drawing Sheets

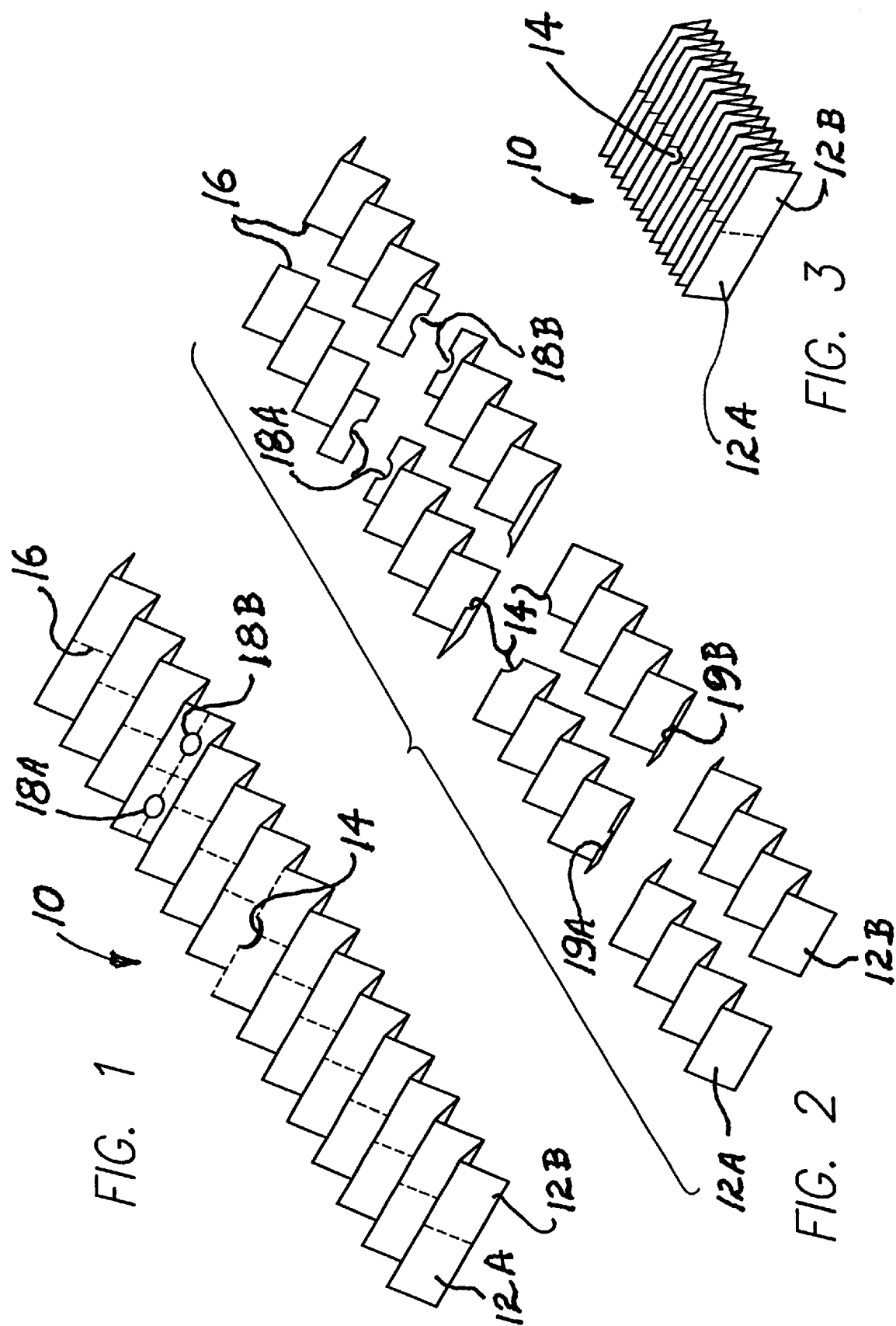

HIGH VISIBILITY MARKING PANEL FOR AERIAL PHOTOGRAMMETRIC GROUND MAPPING

BACKGROUND

In conjunction with low and middle altitude aerial photography, as applied to either single vertical exposures or stereo photogrammetric ground mapping, pre-marking of the ground to facilitate the photo mission and the interpretation of the photos subsequently is a commonly accepted practice. The ground control marks which are provided in the ground marking serve to assist the pilot in a more precise identification of the positions of control points on the ground, as viewed from the air, as well as assisting in recognizing these same points in the photograph for subsequent analysis. Ground pre-marking has been a long accepted practice in ground point identification.

Aerial panels used today for ground marking typically are shaped in a cross, a "VEE", a "TEE", or a "WYE". By far the most widely used configuration is a symmetrical cross, which in most cases is the easiest to distinguish amidst the various shapes and hues of the typical, vertical black-and-white ground photography.

The sizes of the ground marking panels are dependent upon flight altitude, which in turn depends on the mapping scale. Photogrammetrists differ in their preferences for the sizes of targets. The effective size of the ground marking panel also is largely dependent on anticipated shading conditions on the ground, namely contrast, being the most important element in visual point acquisition. Clearly, the sizes are proportional to the altitude in most cases.

At altitudes of less than 1,000 feet above ground level (AGL), panel sizes ("section" or arm-length vs. width) may be as small as 12"×3", particularly when the panel is painted. Usually, white is used for black asphalt surfaces, or when a cross is applied to black cloth or felt paper. At the highest mapping altitudes, panel sections may reach 20'×2', or larger. At ultra-high altitudes, such as those used for aerial mosaic work, pre-marking is not possible. Control point identification in such high altitude situations normally is accomplished by identifying objects which clearly appear in the photography after the photo mission, such as street intersections, a building, or the corner of a cultivated field. This latter process, effected by identifying objects on the photo to provide marking points, is known as "photo identification"; and it also frequently is applied to high and middle altitude projects where the precision requirements have been somewhat relaxed.

Where a more precise ground point identification is required, however, accurate placement and identification of the ground marking panels is necessary. Except in cases where the surveyor or the engineer has latitude to vary the size of the panel, such as paint on pavement, the ground marking practice usually depends upon the availability of commercially produced aerial flagging made of white polyethylene plastic. This plastic material typically is available in 6", 8", 12" and 18" widths. It generally is provided in rolls of these widths, which are cut to length by the surveyor or engineer at the ground marking point. Also in common use, is pre-manufactured, re-usable cloth panels. These typically have a 3" wide white cross or iron cross on a 4'×4' black background.

A common denominator of all pre-marking applications, regardless of the material used, or its size or shape, is that the panel must be securely fastened to the ground. The ground, with all of its irregularities, is the most notable obstacle in panel placement. The two traditional methods of placing existing plastic and cloth materials are either by burying or weighting the corners or ends, or by direct nailing. Nailing directly through a cloth panel along the edges of the tightly stretched cloth material usually is sufficient for the job.

Rolled plastic material, however, cannot be nailed directly through the material, without a backing, due to the brittle nature of the plastic and its succeptability to tearing. A common practice in the use of plastic material is to roll both ends of each section of the panel with a shortened lath stake (typically, a two-man operation). The material is rolled two or three times around the stake. Then, each end of the tightly stretched section is fastened to the ground with nails driven through the rolled stake. The panel is finished by repeating the process, with a second section crossing the first. Generally, nails used in this type of process are whatever is available in the survey crew truck, and NO. 16 and NO. 20 box nails generally are the sizes used.

In addition to the foregoing difficulties, centering the panel over an existing control point or surveyor monument, under normal circumstances, is a matter of judgement of the installer. The installer simply estimates, or actually measures to center the panel over the point from both directions. When the monument projects above the surrounding ground level, a crude hole is cut in the material, allowing for the protrusion of the monument through the hole. This usually sacrifices the integrity of the panel material around its center, through which the monument projects.

Polyethylene plastic sheets and cloth also are very vulnerable to the wind. Consequently, it is extremely important to securely fasten the panel to the ground. In a typical situation, the time between the placement of the surveyor's panel and the photogrammetrists photo mission may be several days, and perhaps even several weeks. It is imperative that the panel is set in such a way as to be taut, as nearly flush as possible to the ground, and fastened tightly. The combination effects of the sun expanding the plastic and the wind's buffeting (particularly of the top section) can destroy the positional accuracy of the panel and/or the photo-visibility of the panel in a relatively short time.

Another problem which exists with all types of aerial photo marking, regarding visibility, is that the effectiveness of the panel is significantly dependent upon the plane of the immediate terrain in which the control point lies. An ideal situation locates the panel at right angles to the photography, or as nearly as possible to horizontal. With vertical exposures, this assumes that the photo mission will take place at such time when the sun is highest in the sky. This results in the maximum illumination of the target (panel).

The terrain on which the panel is placed is almost never truly level, since many of the targets on any given project are situated on hillsides or near ground cover interference. As a result, the contrast of the panel with the surrounding land is frequently quite low. This is commonly a result of sunlight being deflected from the panel. Conversely, on projects with lighter shaded backgrounds, such as sand, decomposed granite, or concrete, illumination of the panel is not desirable; and deflected or absorbed light (such as effected by black paint) is necessary for the highest degree of contrast. Since the panel usually occupies a single plane, the entire panel may be all but lost in typical imagery of non-uniform ground conditions.

The United States patent to Ladd U.S. Pat. No. 1,507,191 is directed to a marker for assisting aviators in flying cross country. This is not a surveyor ground pre-marking device. The marker disclosed in this patent, however, is expensive and complex. It requires the erection of a rather substantial tower, on the top of which is provided indicia to be used by aviators.

Another patent directed to providing visibility from the air for a particular location is Barnes U.S. Pat. No. 1,796,233. This patent is directed to a building roof which has transparent/reflective and opaque sections on it to facilitate its visibility from the air. This is not a surveyor panel or surveyor pre-marker in any sense.

Other patents have been developed for marking a location for identification from the air utilizing complex optical and electronic devices. Some of these devices are used for aerial survey systems or in aerial viewing systems. United States patents directed to such systems are McConnell U.S. Pat. No. 3,766,312; Masterfield U.S. Pat. No. 4,041,529; and LaPeyre U.S. Pat. No. 4,497,551. These are not portable, disposable markers of the type provided by the polyethylene rolled material, or the cloth material described above.

A number of patents are directed to what are known as "drop marker systems" for marking locations on the ground from an aircraft. These markers are dropped from the aircraft; so that on a subsequent pass over that same area, the aircraft can see the marker identifying the location of the drop. Such drop markers are used in crop dusting operations and the like to mark the end of each pass. The pilot then has a particular visual reference to the location of the previous pass, when a new pass is being made. A number of patents directed to drop markers, which have fan-fold panels for visibility by a pilot who is crop dusting, utilize devices including a base member and some type of flexible corrugated board or ribbon attached to it for release and deployment when the base member is dropped from the airplane. United States patents directed to such systems are Tillay U.S. Pat. No. 3,428,019; Huwe U.S. Pat. No. 3,973,513; Taylor U.S. Pat. No. 4,261,283; Forsyth U.S. Pat. No. 4,270,482; Huwe U.S. Pat. No. 4,300,469; Lloyd U.S. Pat. No. 4,316,554; and Loeckle U.S. Pat. No. 4,474,349. None of the devices disclosed in these patents, however, is designed to be applied by persons on the ground. They simply amount to packages or markers dropped from an airplane, which then are designed to elongate in the airstream as they fall from the plane. Thus, upon landing, they are visible from the aircraft. Obviously, precise location of these devices at a surveyed marker point on the ground is not intended.

It is desirable to provide an improved high-visibility aerial ground marking panel, which is easily applied at a precise marking point, which is compact and inexpensive, and which provides enhanced visibility in light sources at various angles.

SUMMARY OF THE INVENTION

It is an object of this invention to provide a high visibility aerial panel system.

It is another object of this invention to provide an aerial panel pre-marking device which is simple and easy for one person to install.

It is an additional object of this invention to provide a ground marking panel providing high visibility at different light angles and which is easy to install.

It is a further object of this invention to provide a high visibility pre-marking panel for use with aerial mapping which is compact, which can be installed accurately and easily, and which provides enhanced visibility from the air under various lighting conditions.

In accordance with a preferred embodiment of the invention, a high visibility ground marking panel, for use in photogrammetric ground mapping, is made of a main body of relatively thin, lightweight corrugated cardboard, the length of which is substantially greater than its width. A hole is formed at the midpoint (both longitudinally and transversely) of the panel body; and the panel body is folded alternately into an accordion type fold for compact storage and subsequent installation. More specific embodiments of the invention include longitudinal and transverse perforations to enable the panel to be split into smaller sections when the full length and full width of the panel are not required for any particular job application. In installation of the panel, the ends are drawn outwardly from the center marker point and are secured to the ground; so that the alternately folded sections diverge at predetermined angles from the ground plane. This enhances the visibility of the panel from the air, and from various angles and under different light conditions.

BRIEF DESCRIPTION OF THE DRAWINGS

FIG. 1 is a top perspective view of a preferred embodiment of the invention in its nearly expanded form for installation;

FIG. 2 is an exploded top perspective view of the embodiment shown in FIG. 1 broken into various sections;

FIG. 3 is a top front perspective view of a preferred embodiment of the invention in its storage or collapsed condition.

DETAILED DESCRIPTION

Figure 4:
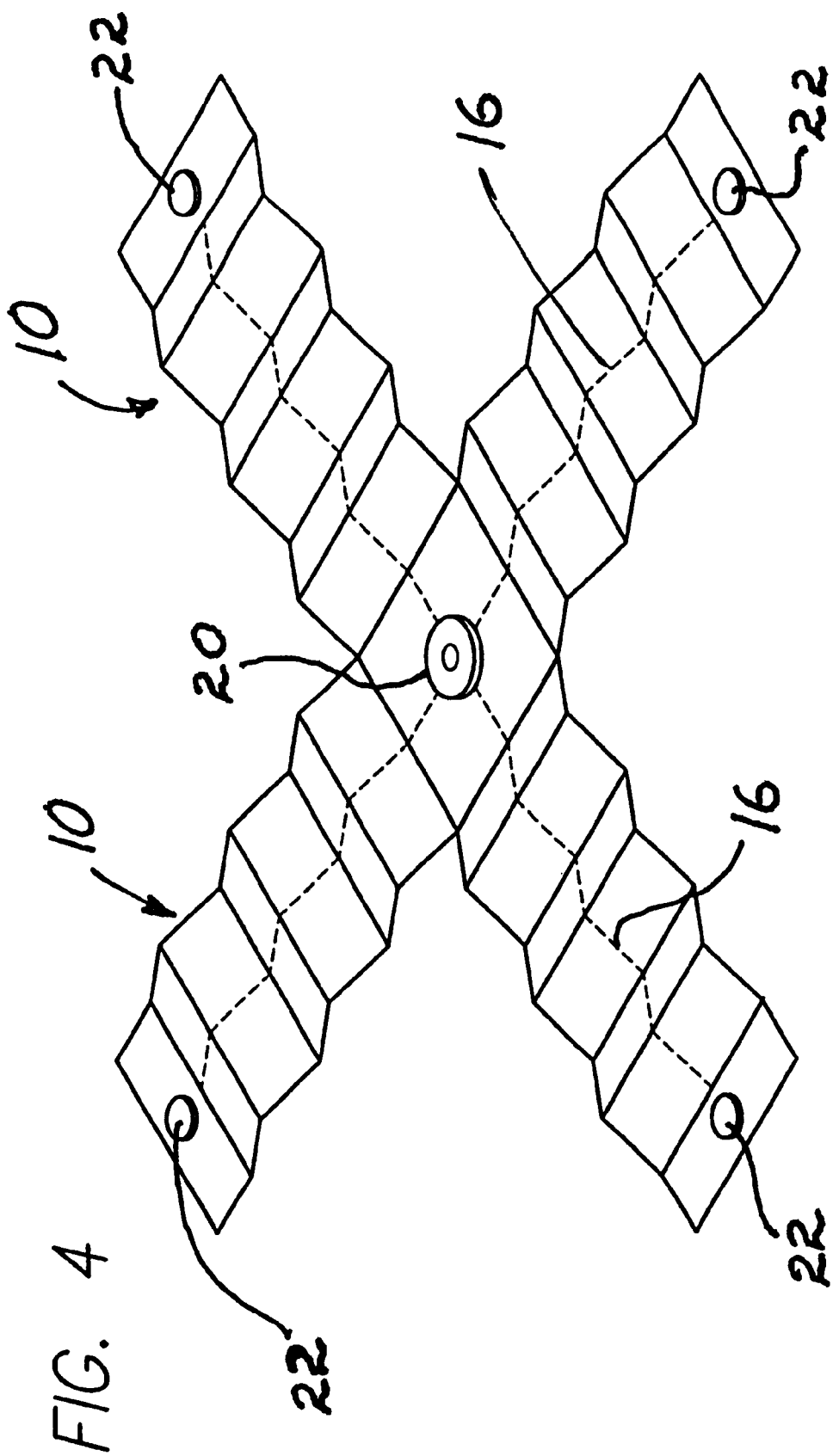
FIG. 4 illustrates the manner of use of a preferred embodiment of the invention.

Reference now should be made to the drawings, in which the same reference numbers are used throughout the different figures to designate the same components. As shown in FIGS. 1 and 3, a preferred embodiment of the invention is illustrated in its expanded and collapsed states, respectively.

The preferred embodiment illustrated in the drawings is a high visibility panel 10 constructed of lightweight corrugated cardboard of the type typically used for paperboard box construction, and the like. Corrugated cardboard is the preferred material, since it is biodegradable; but in applications where biodegradability is not required, or not desired, corrugated plastic board, again of the type widely used in re-usable package containers, also could be utilized. The structure is the same, whether corrugated cardboard or corrugated plastic board is used for making the panel.

A typical panel measures approximately 12" in width by 8' to 12' in length, with a thickness of corrugated material on the order of 1/16" to 1/8". In the panel shown in FIGS. 1, 2 and 3, transverse alternating folds are formed in the panel to form an accordion folded body. The segments for each of the folds are 4" wide or more or less, depending upon the requirements of the application in which the panel is to be used. This accordion or alternating fold is along the entire length of the panel section, as is readily apparent from an examination of FIGS. 1 and 3.

When the panel 10 is manufactured and carried in its storage condition, all of the alternating accordion folds are compressed onto one another, as illustrated in FIG. 3 (and even more tightly than as shown in FIG. 3) to form a very compact package. With a panel 10 of the dimensions given above, each full-sized high visibility panel will measure only 3" by 4" by 12" when it is compressed for storage and carrying. As a result, eight or more full sized panel sections can be carried with very little effort in the average surveyor's stake bag.

As is readily apparent from an examination of FIGS. 1 and 4, when the panel is elongated or stretched out from the storage position shown in FIG. 3, it has first and second surfaces (or upper and lower surfaces, as viewed in FIGS. 1 and 4). For most versatile utilization of the panel, it is painted or stained flat white (or some other reflective color) on its reflective side (such as the upper side shown in FIGS. 1 and 4), and flat black on the deflection side (the bottom, as shown in FIGS. 1 and 4). Thus, depending upon the nature of the topography surrounding the control point which the panel marks, one or the other of these sides may be placed on the ground, with the other facing upwardly toward the air for spotting by the pilot of the aircraft doing the photogrammetric ground mapping.

For higher altitude applications, two full size sections of the type described above are required to form one standard cross-shaped panel, as shown in FIG. 4. As shown in FIG. 1, the panel 10 is perforated with a 3" diameter centering hole centered at the exact midpoint of the panel section (both longitudinally and transversely) for quick removal of a 3" cutout. Alternatively, the cutout 14 could be formed and removed prior to storage of the panel 10 in the configuration shown in FIG. 3. Each panel section further is perforated at mid-width (as illustrated in FIG. 1 along the top fold adjacent the centering hole 14) and at mid-length 16. These perforations facilitate separation of the panel 10 into two elongated half width panels (by splitting the panel section 10 in half longitudinally along the perforations 16 to form sections 12A and 12B) or into four half-size panels (by splitting the panel 10 both longitudinally along the perforations 16 and transversely along the perforations passing through the centering hole 14). The four half-size panels formed in this manner are suitable for use with lower altitude photography.

Each of the four small sections, which are fifty percent of the original section, in turn are perforated with another removable circle (18A/18B and 19A/19B), 1½" in diameter, centered as discussed above for the centering hole 14. Any two small panels of the original full-sized panel 10 may be used to comprise one lower altitude, half-size panel.

Reference now should be made to FIG. 4, which illustrates a typical installation of a pair of full panels 10 in actual ground deployment. As shown in FIG. 4, the high visibility panel 10 removes guesswork and improvisation in the centering of the panel sections 10. The hole 14 makes it possible for one person to effect fast and accurate centering of the panels. Where a control point exists in the form of a stake in the ground, the hole 14 simply is slipped over the top of the stake. As noted above, the panel is manufactured with perforations around the hole 14. Thus, if the hole is not opened by removal of the perforated circle, the surveyor has the option of leaving the perforated circle in place for use in situations where the photo mission occurs before acquisition of the survey data. The control point in such a situation may be a spike or nail 20 (concrete or otherwise) driven directly through the center of the panel 10 into the earth or paved surface beneath it.

Once the center 14 has been secured, such as with the stake 20 shown in FIG. 4, through a pair of crossed panels 10, the panel segments on each side of the center stake 20 are pulled outwardly from the configuration shown in FIGS. 3 and 1 to the configuration shown in FIG. 4. To accomplish this, the workman gently stretches the panel section laterally, outwardly from the center, first on one side and then on the other.

Once the panel 10 has been stretched to the desired length, a stake or nail 22 may be placed in the end. For areas where high winds or adverse conditions are likely to be encountered, other stakes or nails may be placed at any point along the panel where the panel is in contact with the ground, such as the valleys between the accordion folded sections. The density of the ground surface dictates the amount and interval of the nailing. Weighting of the panels 10 may be done; but weighting is recommended only at the ends of the given sections, so that full use of the angled light-reflective surfaces of the panel may be obtained. Generally, additional nailing near the center hole 14, through both the upper and lower crossed panels 10 of the typical installation as shown in FIG. 4, completes the application. Nails which have been found particularly suitable for use with the high visibility panel shown and described are pole barn spikes, which are commercially available as 7", 10 gauge, ring shanked nails. Shorter nails may be used with tighter ground conditions.

An important feature of the high visibility panel which is most readily apparent from an examination of FIGS. 1 and 4 is that the panel design constitutes a three-dimensional structure. When this structure is properly applied, as described above, it is highly resistant to the actions of wind; and the insulating effect of the cardboard eliminates any expansion problems. It should be noted that the lateral stretching described above to produce the configuration illustrated in FIGS. 1 and 4 is not designed to pull the panel sections flat. On the contrary, the segments are intended to diverge between 10° and 30° from the respective ground plane or topographical surface on which the panel is installed. The degree of segment divergence, however, may be varied from this typical range. It depends largely on individual preferences. These preferences may be derived from experience and frequently are dependent upon the natural constraints in the immediate proximity of the panel, such as brush, plantings, walls, fences and other obstacles. Since the panel section is not stretched to its flat limit, the panel section obviously does-not expand to the full 8' to 12" maximum length. This difference, however, is negligible for the true purposes of the finished panel.

It should be noted that when a second panel section 10 is placed over the first, in a cross such as shown in FIG. 4, the top panel section 10 preferably is placed as close to perpendicular to the bottom section as is practical. Again, individual site conditions dictate the final configuration. The segment seams formed by each of the accordion pleat folds provide a visual guide for this 90° offset for the perpendicular top section. The center segments immediately surrounding the hole 14 ultimately are fastened flat to the ground during the process. This provides a clear, unobstructed square plane immediately adjacent the survey point. Typically, two or three sections are flattened in this manner to form the configuration shown in FIG. 4.

The high visibility aerial pre-marking panel secured to the ground as described above and shown in FIG. 4, provides a significant improvement over the contrast problem of the prior art flat sheath (of plastic or cloth). The reason is that the three-dimensional interconnected tents formed by the partially expanded accordion folds provide a multitude of reflecting (or deflecting) planes for light sources which approach the panel from almost any aerial direction.

The panels 10 are highly visible in normal "high sun" (closer to zenith) conditions where ground contrasts created by varied ground cover, relief and shadows are complex. In addition, in situations where flat panels are normally nearly invisible in "low sun" (closer to horizon) conditions, the angled surfaces now readily can be detected both from the aircraft cockpit during mission reconnaissance and in the resulting photographs. A significant improvement over panels of the prior art is accomplished.

The same overall advantages are achieved by use of the smaller sub-panel sections shown in exploded view in FIG. 2. The installation is the same as described above in conjunction with the embodiment shown in FIG. 1; and the advantages over the prior art are the same as when the full panel section 10 of FIGS. 1 and 4 is used. The-operation, installation and benefits are the same. The difference between using the smaller panel sub-sections shown in FIG. 2 over the full panel shown in FIGS. 1 and 4 is simply a matter of the altitude at which the photogrammetric ground mapping is to be undertaken.

The foregoing description of the preferred embodiment of the invention is to be considered as illustrative and not as limiting. Various modifications will occur to those skilled in the art for performing substantially the same function, in substantially the same way, to achieve substantially the same result without departing from the true scope of the invention as defined in the appended claims.

What is claimed is:

1. A method for ground marking control points for use in aerial surveying and aerial photography includes the steps of:

intersecting a pair of high visibility panels of accordion-folded material each having a length which is substantially greater then the width thereof with a centering hole therein;

extending the panels to intersect one another with the centering holes thereof located at a ground point to be identified;

attaching the centering holes of the panels to the ground point;

extending the panels on each side of the ground point to open the accordion folds thereof to predetermined angles with the underlying surface on which the panel is placed; and securing the extended panel sections on each side of the ground point to the underlying surface on which the panel is placed.

2. The method according to claim 1 wherein the step of extending the panel from the center hole causes the segment divergence of the accordion folds thereof to diverge between 10° and 30° from the underlying surface to which the panel is attached.

3. The method according to claim 2 further including a step of coating at least the surface of the panel which faces away from the underlying surface with a coating to enhance visibility of the panel from an aircraft.

4. The method according to claim 3 further providing longitudinal perforations substantially along the center line of the length of the panel for facilitating a further step of separating the panel into two narrower elongated panels prior to implementing the other steps of the method.

5. The method according to claim 4 further including the step of providing transverse perforations at predetermined locations across the width of the panel for facilitating separation of the panel into shorter lengths, when the full length of the original panel is not required.

6. The method according to claim 1 further including a step of coating at least the surface of the panel which faces away from the underlying surface with a coating to enhance visibility of the panel from an aircraft.

7. The method according to claim 1 further providing longitudinal perforations substantially along the center line of the length of the panel for facilitating a further step of separating the panel into two narrower elongated panels prior to implementing the other steps of the method.

8. The method according to claim 7 further including the step of providing transverse perforations at predetermined locations across the width of the panel for facilitating separation of the panel into shorter lengths, when the full length of the original panel is not required.

* * * * *